United States Patent [19]
Potonniee et al.

[11] Patent Number: 6,075,692
[45] Date of Patent: Jun. 13, 2000

[54] UPGRADABLE FUNCTIONAL FEEDER UNIT OF A LOW-VOLTAGE ELECTRICAL CUBICLE

[75] Inventors: Jean-Christophe Potonniee, Aix les bains; Jacques Buet, Saint Pierre d'Albigny; Gérard Hector, Cognin; Philippe Vollet, Saint Egreve; Emile Grosset-Janin; Joseph Rebesco, both of Arbin, all of France

[73] Assignee: Schneider Electric S.A., France

[21] Appl. No.: 09/261,740

[22] Filed: Mar. 3, 1999

[30] Foreign Application Priority Data

Mar. 19, 1998 [FR] France .................. N98 03629

[51] Int. Cl.$^7$ .................................................. H02B 1/20
[52] U.S. Cl. ................................................ 361/649
[58] Field of Search .................................. 439/212, 211, 439/207, 113, 114; 361/648–650, 637–640, 611

[56] References Cited

U.S. PATENT DOCUMENTS 5,144,530   9/1992   Cohen et al. ..................... 361/649

FOREIGN PATENT DOCUMENTS

| 0 407 241 A1 | 1/1991 | European Pat. Off. . |
| 0 808 006 A2 | 11/1997 | European Pat. Off. . |
| 2164523 | 8/1973 | France . |
| 2 562 344 A1 | 10/1985 | France . |
| 2 590 416 A1 | 5/1987 | France . |
| 295 05 243 U1 | 9/1996 | Germany . |

*Primary Examiner*—Gary F. Paumen
*Attorney, Agent, or Firm*—Parkhurst & Wendel, L.L.P.

[57] ABSTRACT

A functional feeder unit of a low-voltage electrical cubicle contains a vertical multipole busbar comprising conducting bars and a mounting plate for support and connection of an electrical apparatus. A protection grid equipped with holes is positioned at the front of the bars which extend edgewise in the parallel vertical planes offset along the transverse direction between two flanges. A connection interface with draw-in contacts is inserted between the protection grid to engage on the corresponding phase bar. Centering means position the mounting plate on the grid to align the ends of the current conductors of the mounting plate on the bars in a direction perpendicular to the connection interface.

6 Claims, 9 Drawing Sheets

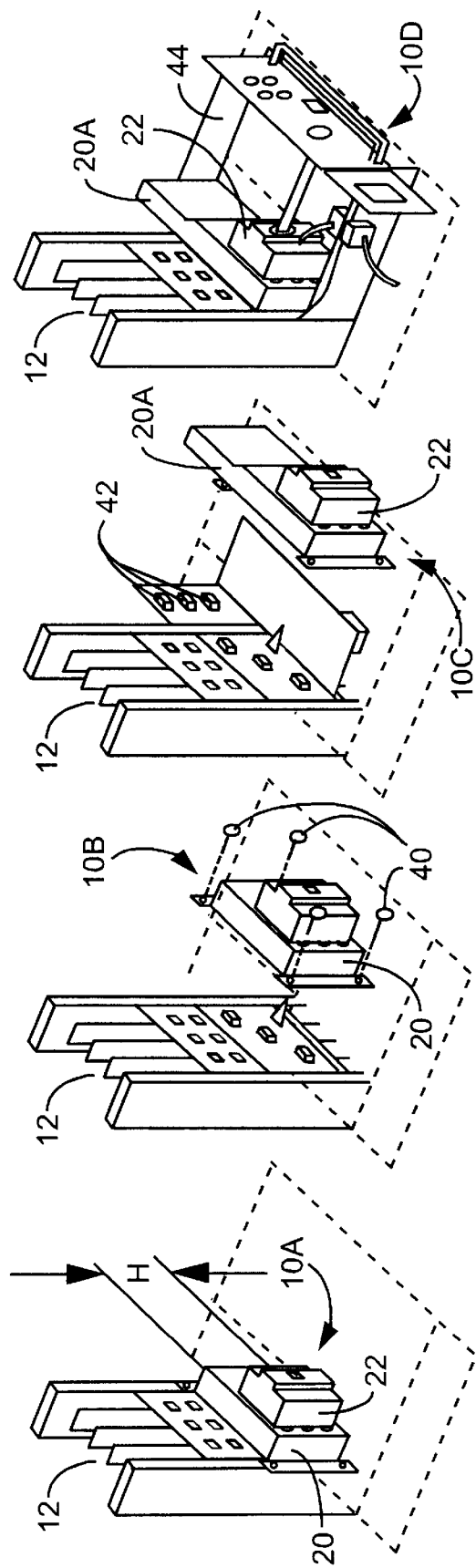

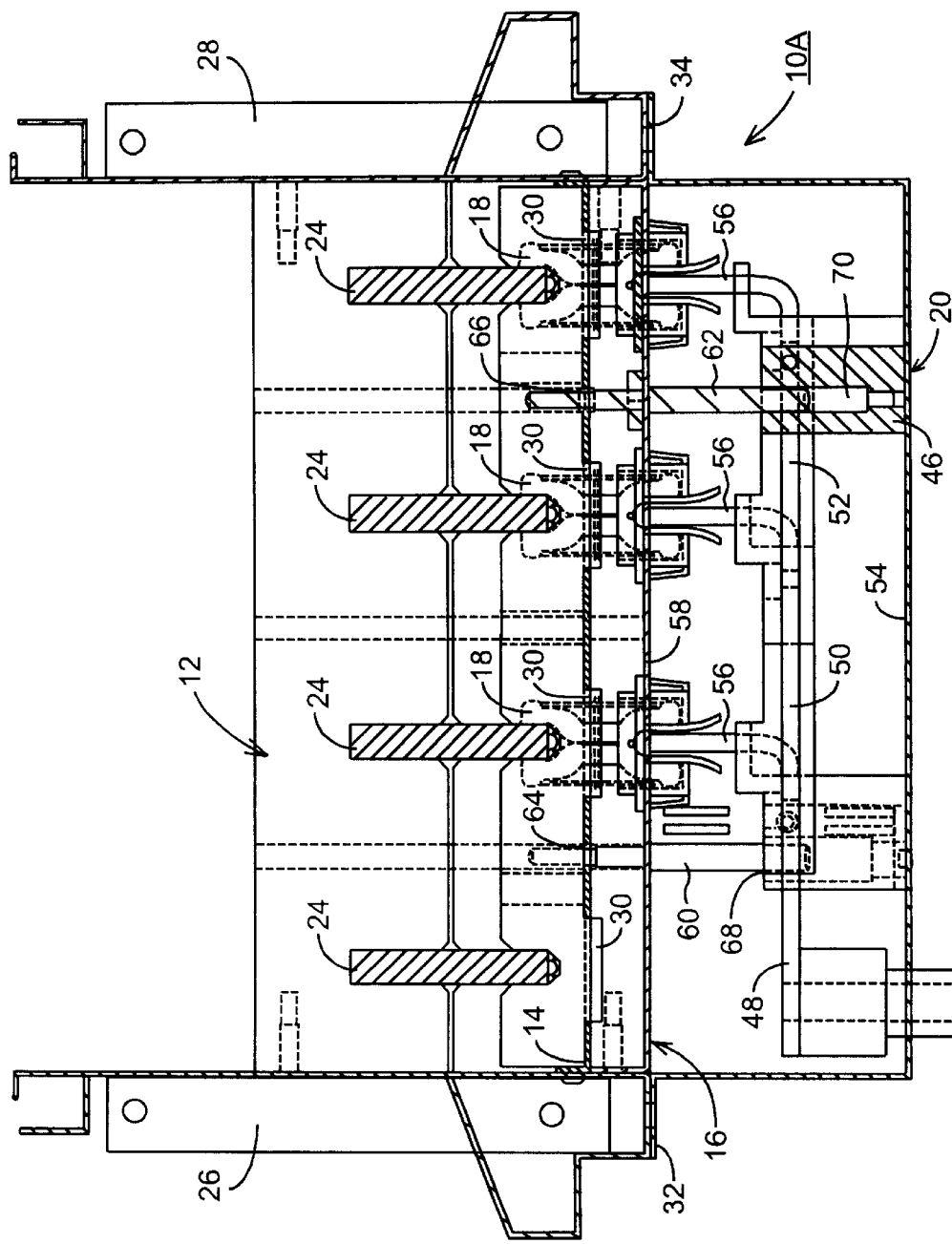

ature feeders of a low-voltage electrical cubicle.

UPGRADABLE FUNCTIONAL FEEDER UNIT OF A LOW-VOLTAGE ELECTRICAL CUBICLE

BACKGROUND OF THE INVENTION

The invention relates to a functional feeder unit of a low-voltage electrical cubicle containing:

a vertical multipole busbar comprising conducting bars extending edgewise in parallel vertical planes staggered along the transverse direction between two flanges, a mounting plate for support and connection of an electrical apparatus, a protection grid positioned at the front of the bars, said grid being equipped with holes, and means for electrical connection of the mounting plate to the busbar comprising a connection interface with draw-in contacts, inserted between the protection grid and the mounting plate, each contact passing through a predetermined hole of the grid to engage on the bar of the corresponding phase.

The connecting means currently used are formed either by connecting cables or by fixing brackets requiring connection operations by clamping. In the first case, the ends of the cables comprise spade connectors fixed onto the bars by means of assembly screws. In the second case, the fixing brackets are secured to the branch conductors of the mounting plate and the assembly is secured directly to the busbar. Such an installation is fixed and does not enable upgrading towards disconnectable or withdrawable solutions. A maintenance operation on the installation requires the busbar to be powered off, which is detrimental to continuity of service.

The document FR-A-2,562,344 describes a low-voltage distribution installation comprising a vertical multipole busbar and a metallic protection grid provided with holes and positioned at the front of the bars. A connection interface with draw-in contacts is inserted between the protection grid and the mounting plate supporting the electrical apparatuses, each contact passing through a predetermined hole of the grid to clamp onto the corresponding phase bar. The first series of draw-in contacts is arranged in a single horizontal plane on one face of the connection interface. A second series of female contacts is necessary on the opposite face of the connection interface to perform connection of the electrical apparatuses to the busbar. The depthwise dimensions of such a connection interface are very large and assembly of the installation takes longer due to the large number of connection parts.

SUMMARY OF THE INVENTION

The object of the invention is to achieve a functional feeder unit enabling the assembly time and maintenance time on the live installation to be reduced, while enabling upgrading to different fixed or disconnectable, removable or withdrawable versions keeping the same height and width of the installation.

The functional feeder unit according to the invention is characterized in that:

the mounting plate comprises coplanar current conductors presenting different lengths, with a heightwise offset in the extension direction of the bars, the draw-in contacts are arranged obliquely on a plate of the connection interface, with an offset corresponding to the distance between the bars of the different phases, and centering means perform positioning of the plate on the protection grid to align the ends of the current conductors of the mounting plate on the bars in a direction perpendicular to the connection interface.

According to one feature of the invention, fitting of the mounting plate on the connection interface causes insertion of the ends of the current conductors in the draw-in contacts opposite the bars.

According to a preferred embodiment, the centering means comprise at least one centering pin secured to the connection interface and operating in conjunction with holes of the grid and holes of the mounting plate. Each centering pin is formed by a rod protruding out on each of the connection interface and extending parallel to the draw-in contacts.

The mounting plate can be equipped with a second series of connecting conductors connected to the load-side terminals of the apparatus and operating in conjunction with load-side draw-in contacts supported by an extension of the connection interface. The second series of connecting conductors is arranged in a single plane offset from that of the current conductors along the draw-in direction of the contacts.

BRIEF DESCRIPTION OF THE DRAWINGS

Other advantages and features will become more clearly apparent from the following description of an embodiment of the invention given as a non-restrictive example only and represented in the accompanying drawings in which:

FIGS. 2 to 5 represent different versions in the same installation height, respectively of the fixed version, the disconnectable version, the removable version and the withdrawable version;

FIG. 6 is a transverse sectional view of the functional unit in fixed or disconnectable version;

DETAILED DESCRIPTION OF THE PREFERRED EMBODIMENT

Figure 1:
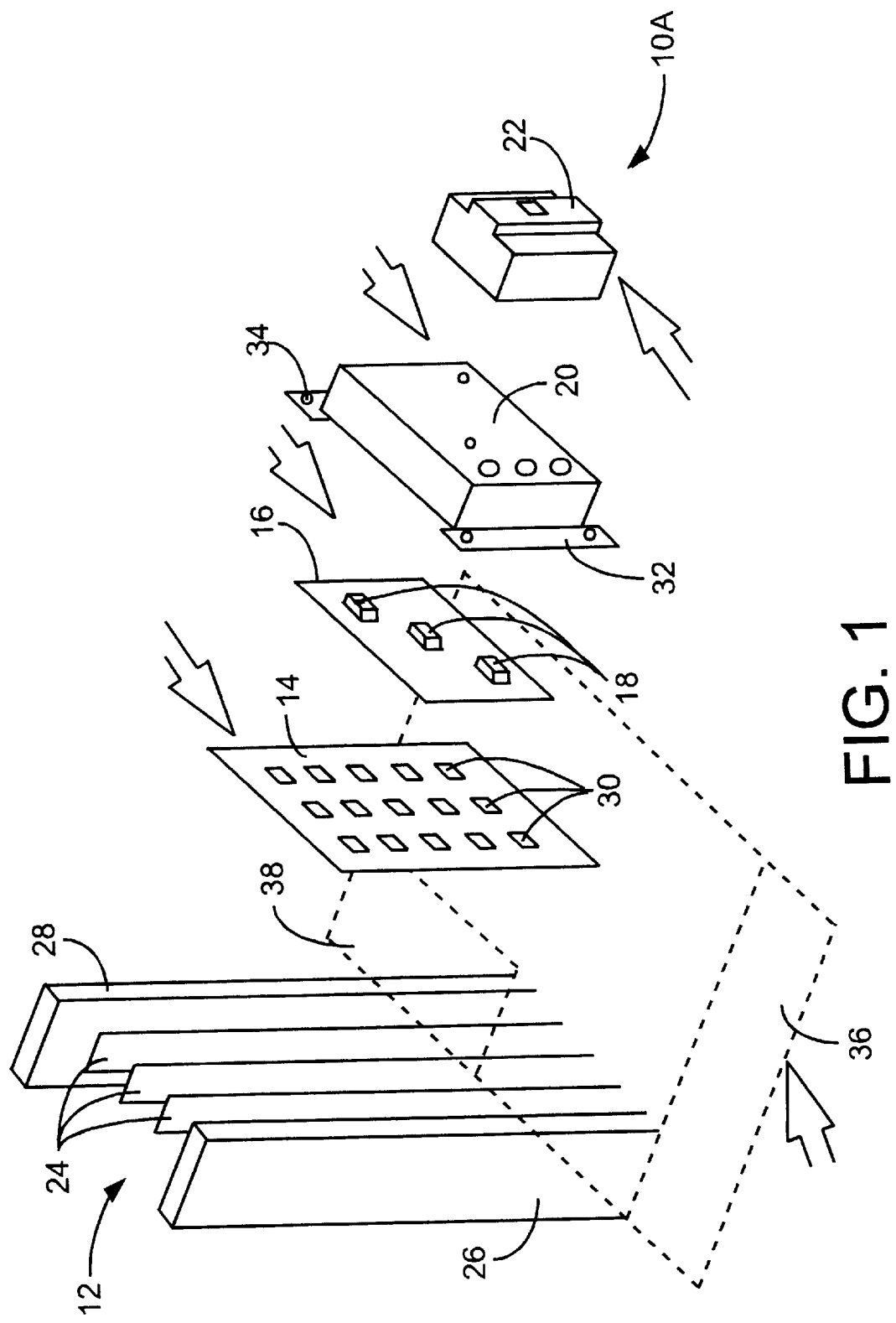
FIG. 1 is an exploded perspective schematic view of a functional unit according to the invention

With reference to FIG. 1, a functional feeder unit 10A of a low-voltage multipole electrical cubicle comprises a vertical busbar 12, a protection grid 14, a connection interface 16 with draw-in contacts 18, and a mounting plate 20 for support and connection of an electrical apparatus 22.

The busbar 12 is formed by three or four conducting bars 24 depending on whether a three-phase installation with or without neutral is involved. The bars 24 of the different phases extend edgeways in the parallel vertical planes, being inserted transversely between two end flanges 26, 28. The protection grid 14 is equipped with a plurality of rectangular holes 30 allowing passage of the draw-in contacts 18 when the fixing interface 16 is fixed onto the busbar 12. The mounting plate 20 presents a parallelepipedic shape provided with two assembly brackets 32, 34 separated from one another by a transverse distance corresponding to the distance between the two flanges 26, 28.

The projected surface of the functional zone of the cubicle is represented in a broken line in FIG. 1. To the left of the flange 26 there is located a first lateral compartment 36 for housing the wiring of the auxiliaries of the electrical apparatus 22. To the right of the other flange 28 there is arranged a second lateral compartment 38 for load-side connection of the output conductors of the apparatus 22.

Figure 7:
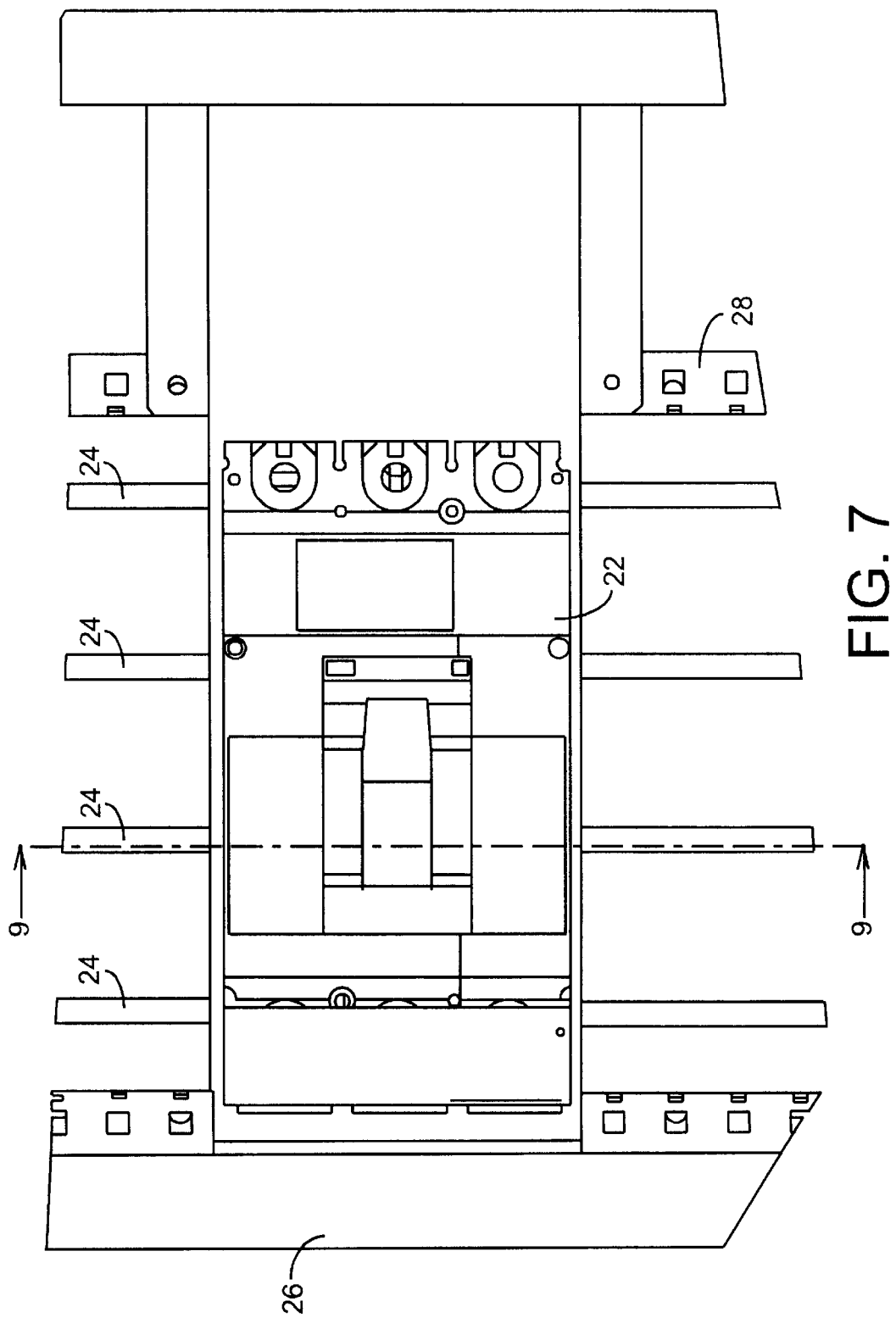
FIG. 7 is an elevational view of a functional unit in removable version.
Figure 8:
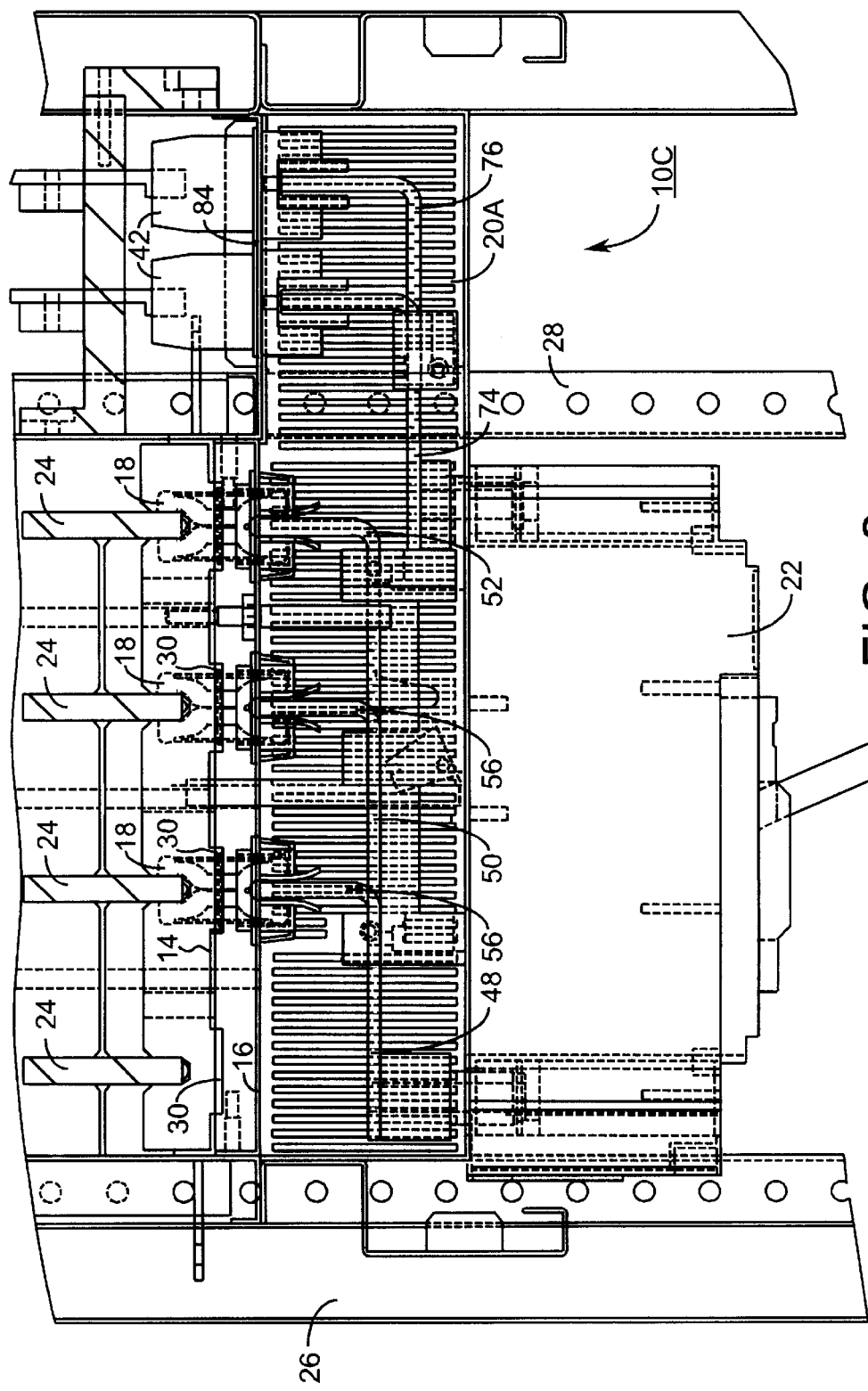
FIG. 8 is a plan view of FIG. 7.
Figure 9:
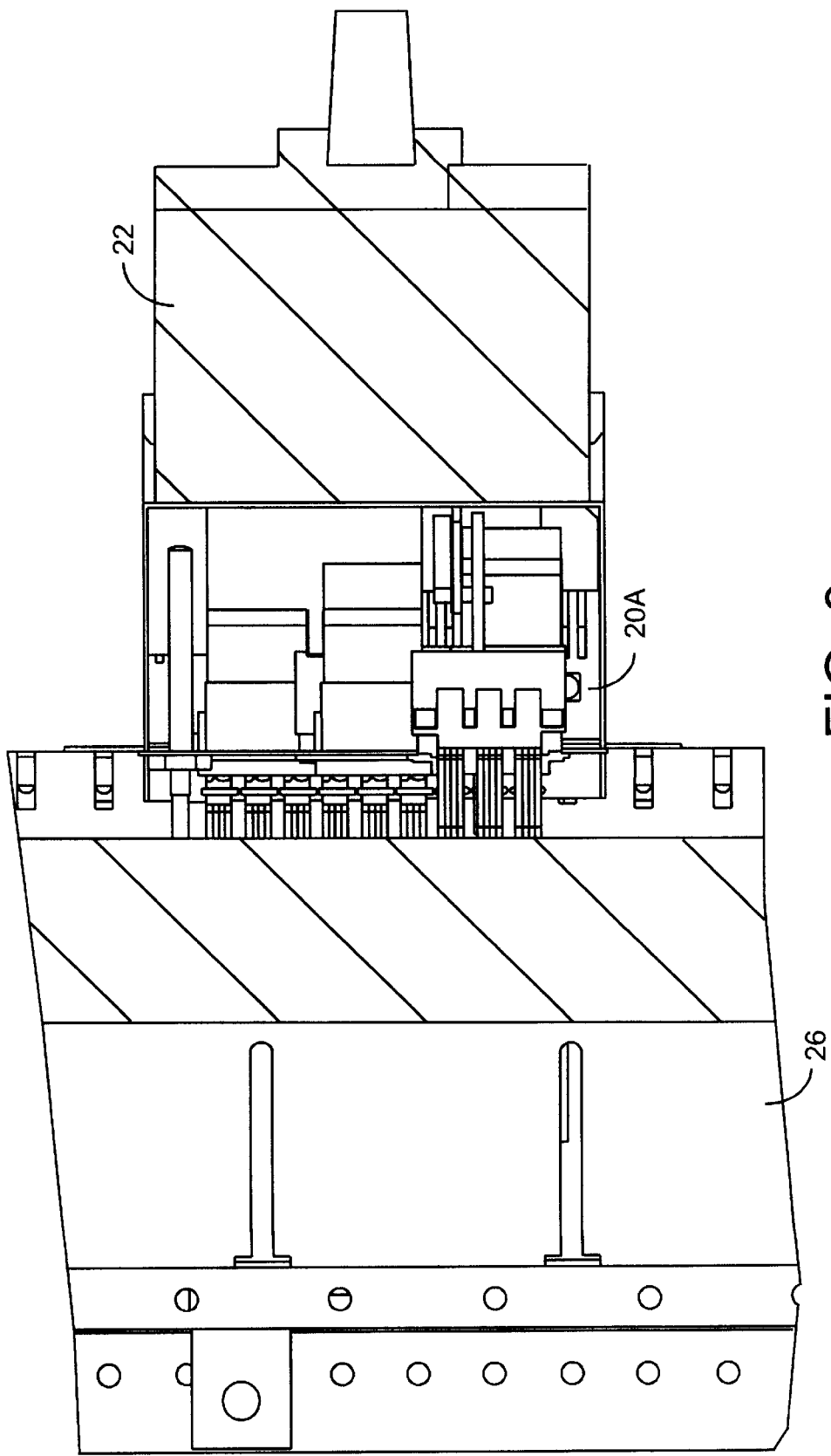
FIG. 9 is a cross sectional view along the line 9—9 of FIG. 7.
Figure 10:
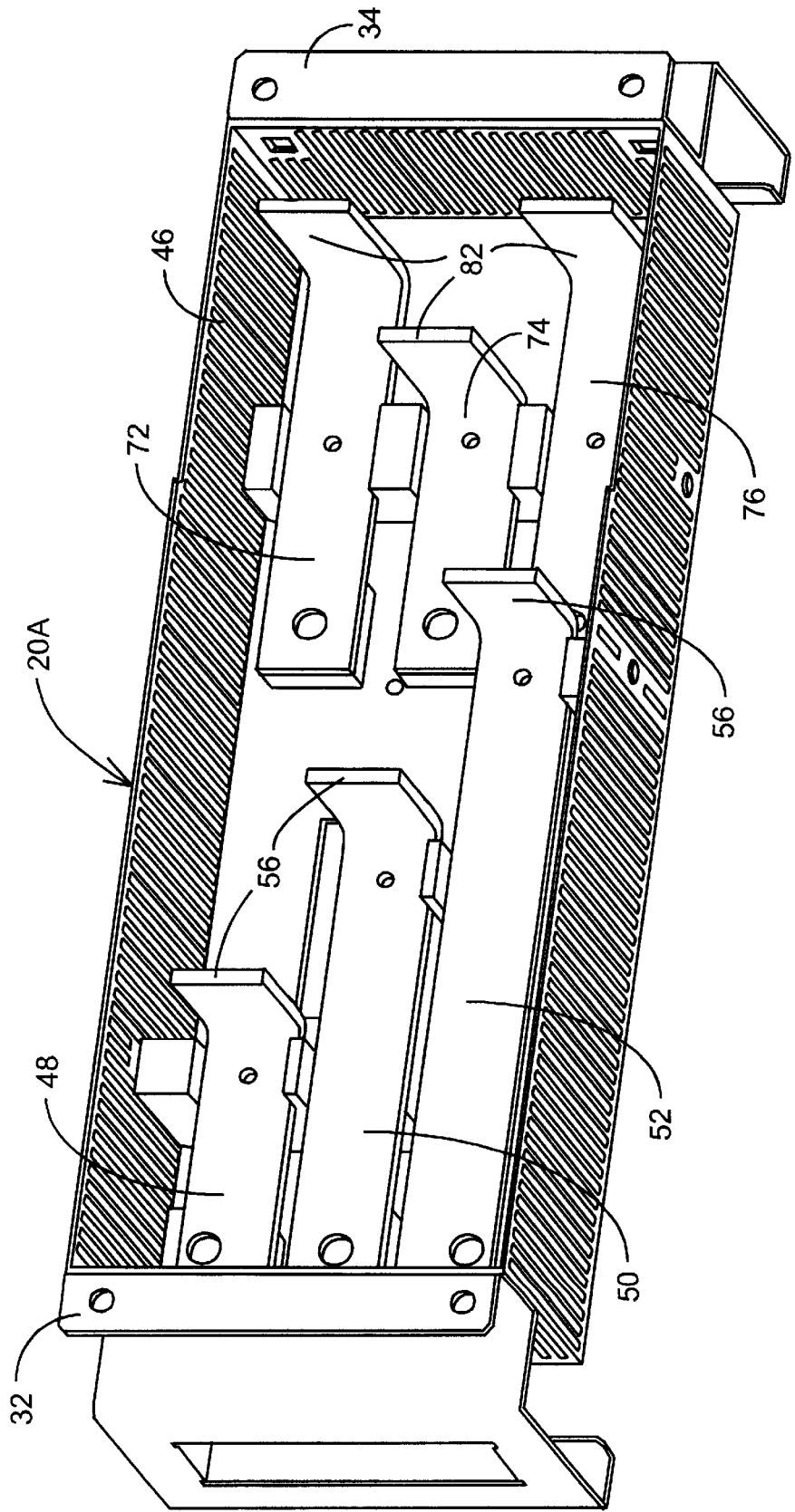
FIGS. 10 and 11 are rear and front perspective views of the mounting plate of FIG. 8.
Figure 11:
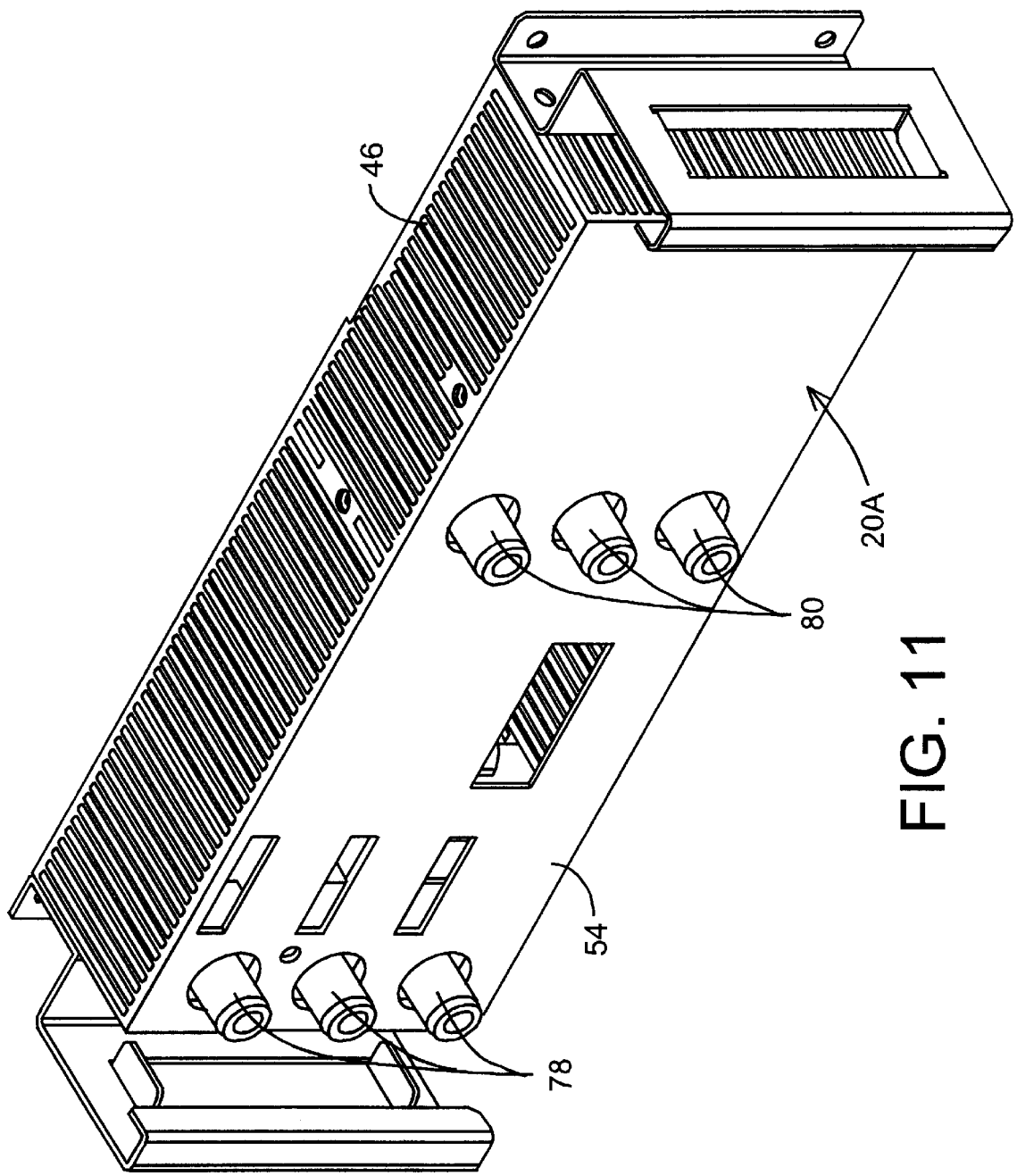

FIG. 2 shows the fixed version of the functional feeder unit 10A in the assembled position wherein the mounting plate 20 is securely fixed with the apparatus 22 onto the flanges 26, 28 of the busbar 12. Load-side connection is performed by means of connecting cables connected to the output terminals of the apparatus 22 and extending in the second compartment 38. Line-side connection of the apparatus 22 with the bars 24 is performed in the central compartment by means of the mounting plate 20 and draw-in contacts 18, as described in detail further on with reference to FIGS. 6 and 7.

FIG. 3 represents a disconnectable version of the functional feeder unit 10B wherein removal of the fixing screws 40 of the mounting plate 20 enables the line-side connection to be disconnected following the forward withdrawal movement of the assembly formed by the mounting plate 20 and the associated apparatus 22.

FIG. 4 shows a removable version of a functional feeder unit 10C, wherein the line-side terminals of the apparatus 22 are withdrawable due to the draw-in contacts 18, and the load-side terminals are disconnectable from draw-in contacts 42 situated on the connection interface 16, in addition to the draw-in contacts 18. The draw-in contacts are in connection with the output conductors connected to the installation. The mounting plate 20A of the apparatus 22 is in this case wider than that 10 of the fixed and disconnectable versions according to FIGS. 2 and 3.

FIG. 5 presents a withdrawable version of a functional feeder unit 10D, wherein the mounting plate 20A and apparatus 22 are placed on an extractable slide rack 44 enabling disconnection of the line-side and load-side connections of the apparatus 22 and also of the wiring of the auxiliaries.

For all the four versions of FIGS. 2 to 5, the installation height H remains identical and the dimensions inside the cubicle are appreciably unchanged, regardless of the version chosen. The functional feeder unit 10A in fixed version (FIG. 2) can easily be customized by complementary references to successively obtain the other versions of FIGS. 3 to 5.

With reference to FIG. 6, the functional feeder unit 10A or 10B of the fixed version, or of the disconnectable version, is represented in top view, after the electrical apparatus 22 has been removed. The mounting plate 20 for support and connection of the apparatus 22 comprises an insulating support 46 containing three or four current conductors 48, 50, 52 of rectangular cross sections and different lengths, respectively connected to the line-side contact terminal strips of the apparatus 22. The three conductors 48, 50, 52 are offset from one another heightwise and arranged in the same plane parallel to the front face 54 supporting the apparatus 22. The ends 56 of the three copper conductors 48, 50, 52 curved to form a bracket are disposed in alignment with the corresponding phase bars 24 of the busbar 12. The connection interface 16 performs the electrical connection between the busbar 12 at the rear and the ends 56 of the current conductors 48, 50, 52. The draw-in contacts 18 are positioned on a plate 58 of the connection interface 16 and extend obliquely (FIG. 1) to respect the offset and dimensioning of the current conductors 48, 50, 52.

The connection interface 16 is equipped with centering pins 60, 62 passing right through the plate 58 to engage on the side where the busbar 12 is located in holes 64, 66 of the grid 14. Positioning of the connection interface 16 on the grid 14 simultaneously causes insertion of the draw-in contacts 18 on the edges of the bars 24 after these contacts have passed through the holes 30. Fitting of the mounting plate 20 on the connection interface 16 takes place after the same centering pins 60, 62 have engaged in holes 68, 70 of the insulating support 46. The ends 56 of the current conductors 48, 50, 52 enter the draw-in contacts 18 at the front of the plate 58, followed by fixing of the assembly brackets 32, 34 onto the flanges 26, 28 of the busbar 12.

Bilateral fitting of the centering pins 60, 62 in the holes 64, 66 of the grid 14 and in the holes 68, 70 of the mounting plate 20 enables perfect alignment of the ends 56 of the current conductors 48, 50, 52 with the copper bars 24 of the corresponding phases of the busbar 12 to be obtained. Electrical connection between the busbar 12 and the line-side terminals of the apparatus 22 is achieved quickly without securing screws.

In FIGS. 7 to 11, the functional feeder unit 10C of the removable version has a connection of the line-side terminals identical to that previously described with reference to FIG. 6. The joining parts of the line-side terminals by draw-in contacts bear for this purpose the same reference numbers and will not be further described in the following. Connection of the load-side terminals of the apparatus 22 is no longer performed by cables directly connected to the load-side terminals of the apparatus 22, but by means of a second series of connecting conductors 72, 74, 76 housed in the case 46 of the mounting plate 20A.

The mounting plate 20A supporting the electrical apparatus 22 contains the first series of current conductors 48, 50, 52 transversely aligned with the second series of connecting conductors 72, 74, 76 which are disposed in a single plane slightly offset with respect to the draw-in direction of the contacts 18. Connection studs 78, 80 protrude out from the front face 54 of the mounting plate 20A and are in electrical connection with the conductors of the two series. The studs 78 and 80 are respectively interconnected with the line-side and load-side terminals of the three-phase apparatus 22 when the latter is positioned on the front face 54 of the mounting plate 20A.

The curved ends 82 of the connecting conductors 72, 74, 76 operate in conjunction with the draw-in contacts 42 when the other ends 56 of the current conductors 48, 50, 52 enter into the draw-in contacts 18. The draw-in contacts 42 are supported by an extension 84 of the connection interface 16.

Figure 12:
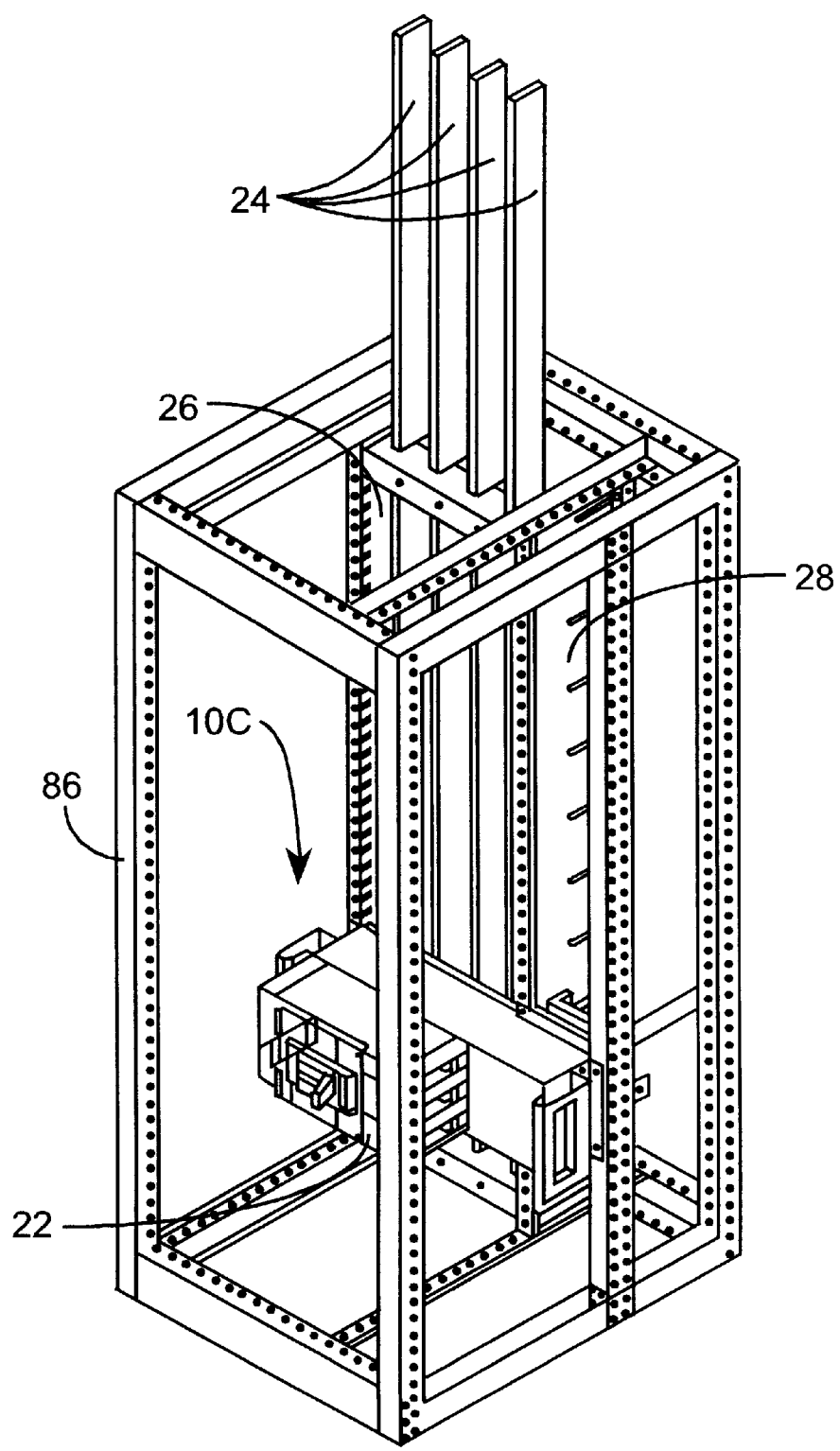
FIG. 12 shows a perspective view of the functional feeder integrated in the framework of a cubicle.

FIG. 12 shows the functional feeder unit 10C incorporated in the metallic framework 86 of the cubicle.

What is claimed is:

1. A functional feeder unit of a low-voltage electrical cubicle containing:
   a vertical multipole busbar comprising conducting bars extending edgewise in parallel vertical planes staggered along the transverse direction between two flanges,
   a mounting plate for support and connection of an electrical apparatus,
   a protection grid positioned at the front of the bars, said grid being equipped with holes,
   and means for electrical connection of the mounting plate to the busbar comprising a connection interface with draw-in contacts, inserted between the protection grid and the mounting plate, each draw-in contact passing through a predetermined hole of the grid to engage on the bar of the corresponding phase, wherein:
the mounting plate comprises coplanar current conductors presenting different lengths, with a heightwise offset in the extension direction of the bars,
the draw-in contacts are arranged obliquely on a plate of the connection interface, with an offset corresponding to the distance between the bars of the different phases,
and centering means which perform positioning of the plate on the protection grid to align the ends of the current conductors of the mounting plate on the bars in a direction perpendicular to the connection interface.

2. The functional feeder unit of a low-voltage electrical cubicle according to claim 1, wherein fitting of the mounting plate on the connection interface causes insertion of the ends of the current conductors in said draw-in contacts opposite the bars.

3. The functional feeder unit of a low-voltage electrical cubicle according to claim 1, wherein the centering means comprise at least one centering pin secured to the connection interface and operating in conjunction with holes of the grid and holes of the mounting plate.

4. The functional feeder unit of a low-voltage electrical cubicle according to claim 3, wherein each centering pin is formed by a rod protruding out on each side of the connection interface and extending parallel to the draw-in contacts.

5. The functional feeder unit of a low-voltage electrical cubicle according to claim 1, wherein the mounting plate comprises a second series of connecting conductors connected to the load-side terminals of the apparatus and operating in conjunction with draw-in contacts supported by an extension of the connection interface.

6. The functional feeder unit of a low-voltage electrical cubicle according to claim 5, wherein the second series of connecting conductors is arranged in a single plane offset from that of the current conductors along the draw-in direction of the contacts.

* * * * *